US012699726B2

(12) United States Patent
Zhou et al.

(10) Patent No.: US 12,699,726 B2
(45) Date of Patent: Aug. 4, 2026

(54) DATA AND ARTIFICIAL INTELLIGENCE-DRIVEN AUTOMATIC DATA MODEL BUILD

(71) Applicant: International Business Machines Corporation, Armonk, NY (US)

(72) Inventors: Qi Liang Zhou, Xi'An (CN); Rui Han, Xi'An (CN); Yuan Yuan Ding, Shanghai (CN); Yong Zhang, ChongQing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 19/010,867

(22) Filed: Jan. 6, 2025

(65) Prior Publication Data

US 2026/0195367 A1    Jul. 9, 2026

(51) Int. Cl.
*G06F 16/36* (2019.01)
*G06F 16/28* (2019.01)

(52) U.S. Cl.
CPC .......... *G06F 16/367* (2019.01); *G06F 16/284* (2019.01)

(58) Field of Classification Search
CPC .............................. G06F 16/367; G06F 16/284
USPC ........................................................ 707/794
See application file for complete search history.

(56) References Cited

U.S. PATENT DOCUMENTS

| | | | |
|---|---|---|---|
| 8,122,429 B2 | 2/2012 | Ramsey et al. | |
| 11,801,773 B1 * | 10/2023 | Overfield | B60L 58/26 |
| 11,893,010 B1 | 2/2024 | Neels et al. | |
| 12,079,737 B1 | 9/2024 | Biswas | |
| 2018/0253496 A1 * | 9/2018 | Natchu | G06F 16/951 |
| 2019/0325062 A1 * | 10/2019 | Rogulenko | G06F 16/2343 |
| 2020/0019546 A1 * | 1/2020 | Luo | G06F 16/245 |
| 2023/0289698 A1 * | 9/2023 | Bly | G06Q 10/06393 |
| 2024/0051676 A1 * | 2/2024 | Palombini | B64D 33/08 |
| 2024/0127905 A1 * | 4/2024 | Parnaby | G16B 40/20 |
| 2024/0345551 A1 * | 10/2024 | Ramanasankaran | |
| | | | G06N 3/0895 |

FOREIGN PATENT DOCUMENTS

| | | | | |
|---|---|---|---|---|
| CN | 113742401 A | * 12/2021 | ......... | G06F 16/2462 |
| CN | 112612835 B | 9/2022 | | |
| CN | 117648926 A | 3/2024 | | |
| CN | 117668242 A | * 3/2024 | ............. | G06N 5/027 |

(Continued)

OTHER PUBLICATIONS

Hong et al., "Knowledge-to-SQL: Enhancing SQL Generation with Data Expert LLM", arXiv:2402.11517v3 [cs.CL], Jun. 6, 2024, 12 pages.

*Primary Examiner* — Kuen S Lu
(74) *Attorney, Agent, or Firm* — Steven M. Bouknight

(57) ABSTRACT

An embodiment includes responsive to receiving a dataset, determining by a system a relationship of a datastore by training a machine learning model wherein the machine learning model comprises an embedding model based on an attribute of the datastore. The embodiment includes determining by the system, a rule of the dataset using the machine learning model and the relationship of the datastore. The embodiment also includes computing using the machine learning model, a result for the rule of the dataset based on the datastore where the result comprises a description of the rule of the dataset in the datastore.

17 Claims, 12 Drawing Sheets

(56)             References Cited

FOREIGN PATENT DOCUMENTS

| CN | 118394740 | A  |   | 7/2024 | |
|----|-----------|----|---|--------|--------------|
| DE | 102024200495 | A1 | * | 7/2025 | ........... G06N 3/0475 |
| KR | 20240117322 | A  | * | 8/2024 | ............ G16Y 40/30 |
| KR | 102778828 | B1 | * | 3/2025 | ............ G06Q 10/06 |
| WO | WO-2018160747 | A1 | * | 9/2018 | ............ G06F 40/00 |
| WO | WO-2020147595 | A1 | * | 7/2020 | ......... G06F 16/9024 |

\* cited by examiner

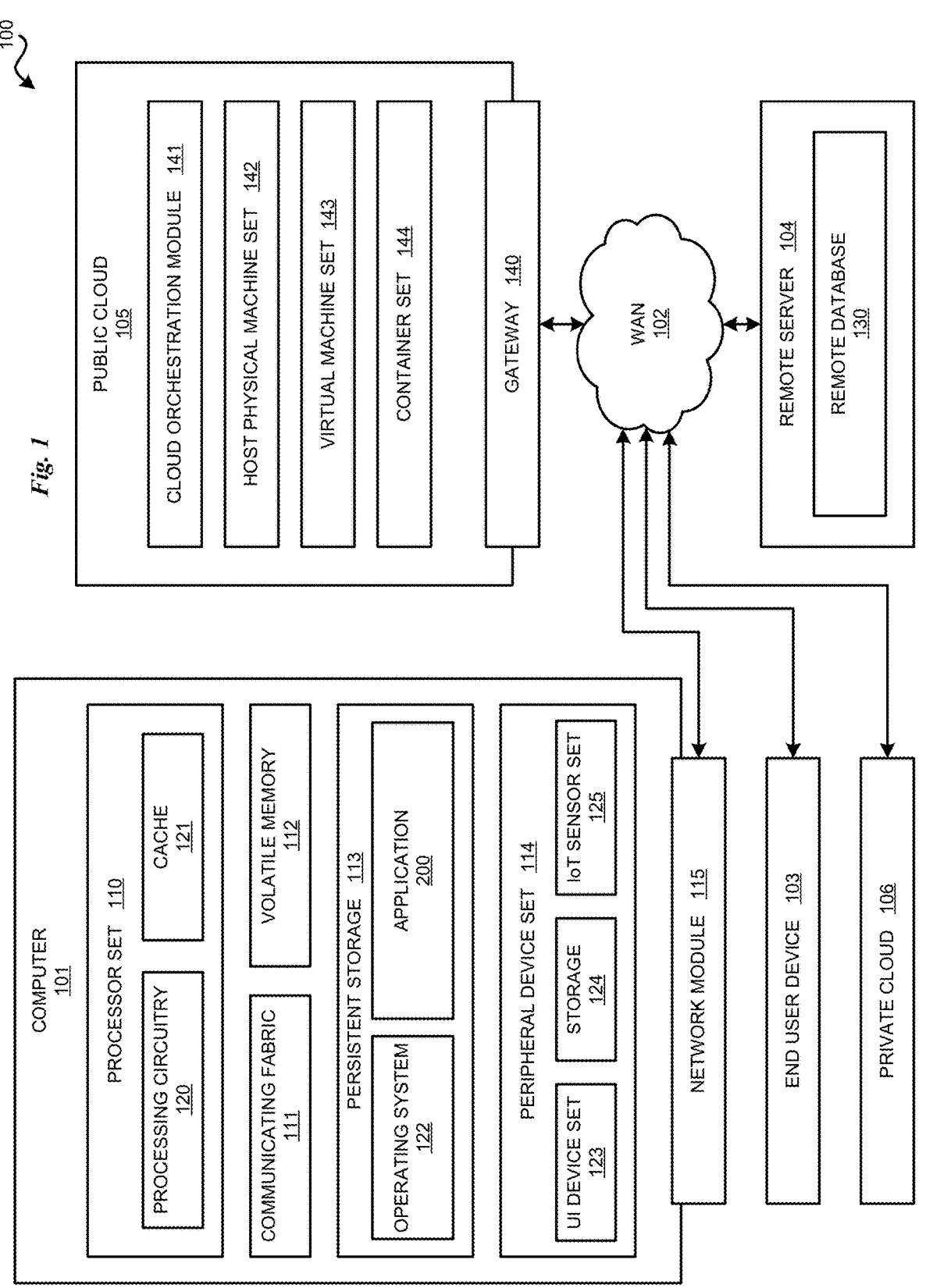

COMPUTER 101

PROCESSOR SET 110

PROCESSING CIRCUITRY 120

CACHE 121

COMMUNICATING FABRIC 111

VOLATILE MEMORY 112

PERSISTENT STORAGE 113

OPERATING SYSTEM 122

APPLICATION 200

PERIPHERAL DEVICE SET 114

UI DEVICE SET 123

STORAGE 124

IoT SENSOR SET 125

NETWORK MODULE 115

END USER DEVICE 103

PRIVATE CLOUD 106

WAN 102

REMOTE SERVER 104

REMOTE DATABASE 130

PUBLIC CLOUD 105

CLOUD ORCHESTRATION MODULE 141

HOST PHYSICAL MACHINE SET 142

VIRTUAL MACHINE SET 143

CONTAINER SET 144

GATEWAY 140

DETERMINE RELATIONSHIPS
235

230

SUB-GRAPH DETERMINING
255

RULE EXTRACTION BASED ON LLM
250

CODE GENERATION
275

RESULT TABLE GENERATION
270

FINAL REPORT TABLE GENERATION
260

PRD
245

265

240

220

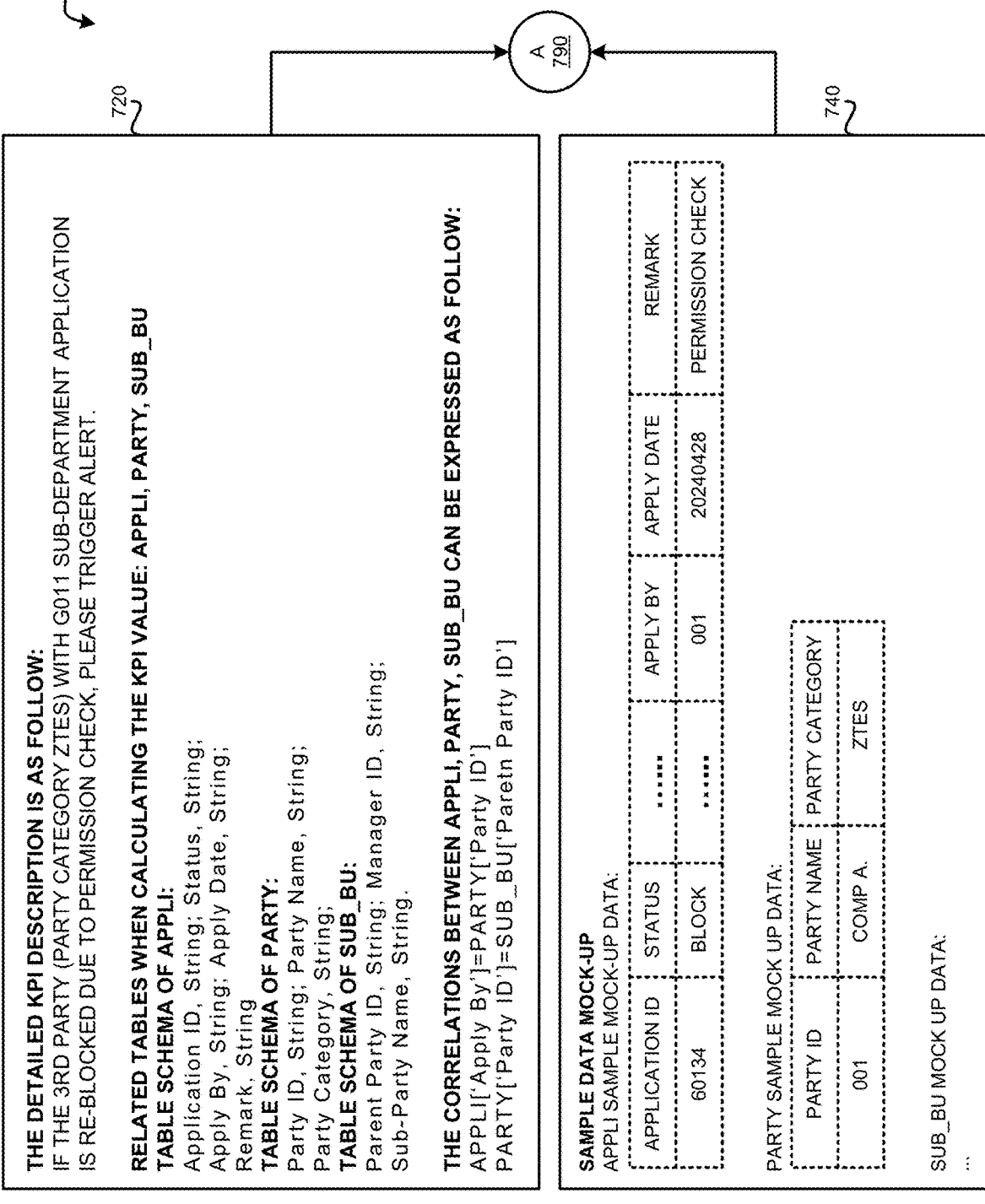

Fig. 7A

THE DETAILED KPI DESCRIPTION IS AS FOLLOW:
IF THE 3RD PARTY (PARTY CATEGORY ZTES) WITH G011 SUB-DEPARTMENT APPLICATION IS RE-BLOCKED DUE TO PERMISSION CHECK, PLEASE TRIGGER ALERT.

RELATED TABLES WHEN CALCULATING THE KPI VALUE: APPLI, PARTY, SUB_BU
TABLE SCHEMA OF APPLI:
Application ID, String; Status, String;
Apply By, String; Apply Date, String;
Remark, String
TABLE SCHEMA OF PARTY:
Party ID, String; Party Name, String;
Party Category, String;
TABLE SCHEMA OF SUB_BU:
Parent Party ID, String; Manager ID, String;
Sub-Party Name, String.

THE CORRELATIONS BETWEEN APPLI, PARTY, SUB_BU CAN BE EXPRESSED AS FOLLOW:
APPLI['Apply By']=PARTY['Party ID']
PARTY['Party ID']=SUB_BU['Paretn Party ID']

SAMPLE DATA MOCK-UP
APPLI SAMPLE MOCK-UP DATA:

| APPLICATION ID | STATUS | APPLY BY | ...... | APPLY DATE | REMARK |
|---|---|---|---|---|---|
| 60134 | BLOCK | 001 | ...... | 20240428 | PERMISSION CHECK |

PARTY SAMPLE MOCK UP DATA:

| PARTY ID | PARTY NAME | PARTY CATEGORY |
|---|---|---|
| 001 | COMP A. | ZTES |

SUB_BU MOCK UP DATA:
...

*Fig. 7B*

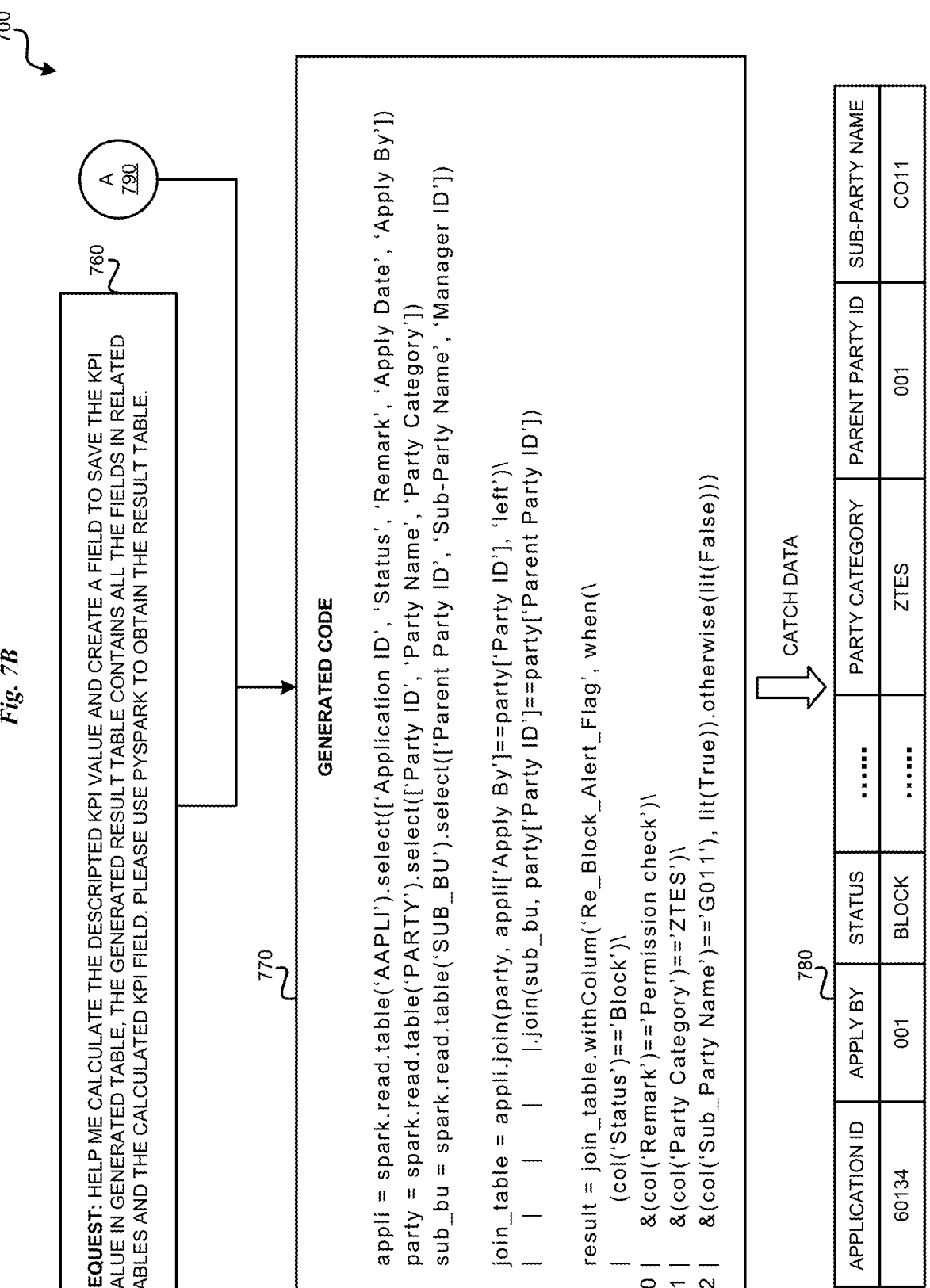

700

790
A

760
REQUEST: HELP ME CALCULATE THE DESCRIPTED KPI VALUE AND CREATE A FIELD TO SAVE THE KPI VALUE IN GENERATED TABLE, THE GENERATED RESULT TABLE CONTAINS ALL THE FIELDS IN RELATED TABLES AND THE CALCULATED KPI FIELD. PLEASE USE PYSPARK TO OBTAIN THE RESULT TABLE.

GENERATED CODE

770

```
1    appli = spark.read.table('AAPLI').select(['Application ID', 'Status', 'Remark', 'Apply Date', 'Apply By'])
2    party = spark.read.table('PARTY').select(['Party ID', 'Party Name', 'Party Category'])
3    sub_bu = spark.read.table('SUB_BU').select(['Parent Party ID', 'Sub-Party Name', 'Manager ID'])
4
5    join_table = appli.join(party, appli['Apply By']==party['Party ID'], 'left')\
6        |.join(sub_bu, party['Party ID']==party['Parent Party ID'])
7
8    result = join_table.withColum('Re_Block_Alert_Flag', when(\
9        (col('Status')=='Block')\
10       &(col('Remark')=='Permission check')\
11       &(col('Party Category')=='ZTES')\
12       &(col('Sub_Party Name')=='G011'), lit(True)).otherwise(lit(False)))
```

CATCH DATA

780

| APPLICATION ID | APPLY BY | STATUS | ...... | PARTY CATEGORY | PARENT PARTY ID | SUB-PARTY NAME |
|---|---|---|---|---|---|---|
| 60134 | 001 | BLOCK | ...... | ZTES | 001 | CO11 |

1000

NETWORK COMPONENT
1020

DATA STORE
1040

MACHINE LEARNING
1060

CPU
1080

DATA AND ARTIFICIAL INTELLIGENCE-DRIVEN AUTOMATIC DATA MODEL BUILD

BACKGROUND

The present invention relates generally to data modeling. More particularly, the present invention relates to a method, system, and computer program for Data and Artificial Intelligence-driven Automatic Data Model Build.

Data modeling is the process of creating a representation of either a whole information system or parts of it to communicate connections between data points and structures. Data models are built around rules and requirements that are defined so they can be incorporated into the design of a new system or adapted in the iteration of an existing one. They play an important role in supporting processes and planning IT architecture and strategy. Data models can be shared with vendors, partners, and/or industry peers. Data modeling makes it easier for developers, data architects, business analysts, and other stakeholders to view and understand relationships among the data in a database or data warehouse.

Machine learning models may comprise of a neural network which is a computing system made up of a number of simple, highly interconnected processing elements (nodes), which process information by their dynamic state response to external inputs. Machine learning models are processing devices (algorithms and/or hardware) that are loosely modeled after the neuronal structure of the mammalian cerebral cortex but on much smaller scales. A large machine learning model might have hundreds or thousands of processor units, whereas a mammalian brain has billions of neurons with a corresponding increase in magnitude of their overall interaction and emergent behavior.

SUMMARY

The illustrative embodiments provide for Data and Artificial Intelligence-driven Automatic Data Model Build. An embodiment includes responsive to receiving a dataset, determining by a system a relationship of a datastore by training a machine learning model wherein the machine learning model comprises an embedding model based on an attribute of the datastore. The embodiment includes determining by the system, a rule of the dataset using the machine learning model and the relationship of the datastore. The embodiment also includes computing using the machine learning model, a result for the rule of the dataset based on the datastore wherein the result comprises a description of the rule of the dataset in the datastore.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 1 depicts a block diagram of a computing environment in accordance with an illustrative embodiment;

FIG. 7A depicts a block diagram that illustrates an example of computing a result for a rule of the dataset in an environment in accordance with an illustrative embodiment;

FIG. 7B depicts a block diagram that illustrates an example of computing a result for a rule of the dataset in an environment in accordance with an illustrative embodiment;

DETAILED DESCRIPTION

Figure 2:
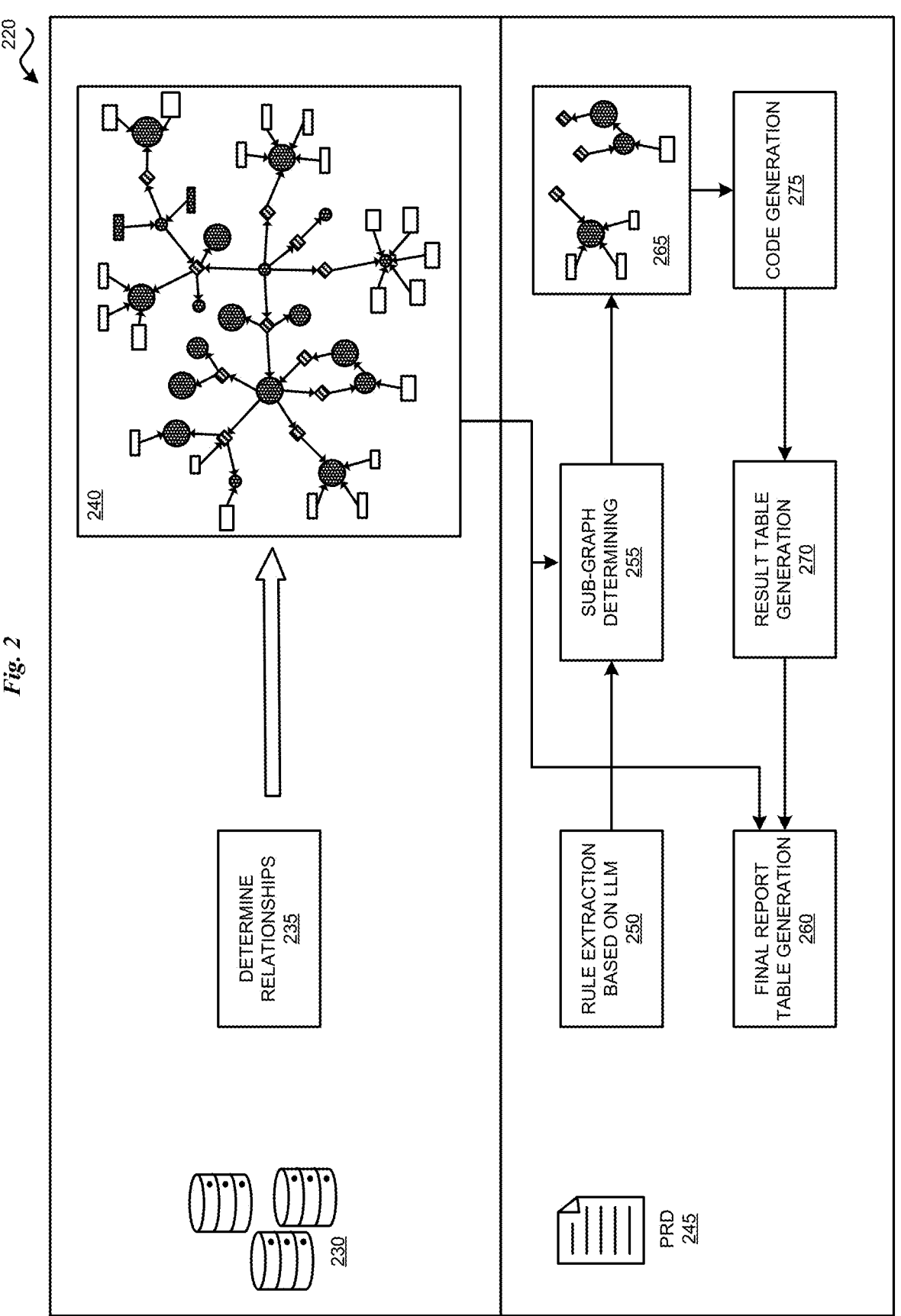
FIG. 2 depicts a block diagram that illustrates an example of artificial intelligence driven data modeling in an environment in accordance with an illustrative embodiment.

In the realm of data engineering, the burgeoning expansion of data volume coupled with the diversification of requisites has rendered the conventional data model construction process increasingly arduous and inefficient. Typically, data engineers are compelled to painstakingly devise and implement data models incrementally, drawing from product requirements documents or lists of specifications, a method fraught with time consumption and susceptibility to errors.

Existing technological solutions offer some degree of automation in data modeling through tools like Power BI, Tableau, and SQL Power Architect, furnishing users with visual interfaces to facilitate the creation of data models. However, these tools predominantly hinge on manual operations, necessitating users to execute copious manual configurations and adjustments, thereby constraining the level of automation and efficiency. Moreover, these tools operate on existing source data, precluding them from executing data regeneration and processing.

There are three main challenges. First, the conventional data model construction process relies on manual design and development, demanding substantial human resource allocation and proving inefficient. Second, owing to the profusion of manual interventions and intricate operations, the construction cycle of data models typically elongates, failing to align with swiftly evolving requirements. And third, human operations are susceptible to introducing errors, potentially resulting in irrational data model designs or data quality issues, thereby impinging upon service operability. Confronted with these challenges, the proposition of automated data model construction assumes paramount importance. By integrating data and artificial intelligence technologies, methodologies facilitating the automated construction of data models can markedly augment construction efficiency and mitigate the risk of human error.

The efficacy of automatic construction hinges on the formulation of the algorithm and the quality of the data. An apt algorithm can adeptly craft a data model in accordance with the data's characteristics and requirements, while high-quality data can guarantee the accuracy and usability of the model. Nonetheless, in practical applications, data quality often poses a challenge, thereby necessitating collaboration with data cleaning and preprocessing to enhance data quality, thereby ensuring the accuracy of automatic construction.

The following description provides examples of embodiments of the present disclosure, and variations and substitutions may be made in other embodiments. Several examples will now be provided to further clarify various aspects of the present disclosure.

Example 1: A computer-implemented method that comprises responsive to receiving a dataset, determining by a system a relationship of a datastore by training a machine learning model wherein the machine learning model comprises an embedding model based on an attribute of the data store. The method further comprises determining by the system, a rule of the dataset using the machine learning model and the relationship of the datastore. The method further comprises computing using the machine learning model, a result for the rule of the dataset based on the datastore where the result comprises a description of the rule of the dataset in the datastore.

The above limitations advantageously enable building a Data and Artificial Intelligence-driven automatic data model. These limitations improve on the functionality of a system providing an accurate method to generate a data model based a machine learning model and to efficiently compute the result of a rule of a dataset based on the datastore. Furthermore, the limitations improve computer functionality since the machine learning model of the system is trained based on an embedding model reducing the load on processors, memory and network.

The term dataset as disclosed herein may comprise a product requirements document (PRD) and/or similar requirements document for industrial or business, and/or a combination comprising all or some of the aforementioned or a combination thereof.

The term rule as disclosed herein may comprise an indicator such as a key performance indicator (KPI) and/or a measurable metric for a product, industry or business. However, use of this example is not intended to be limiting but is instead used for descriptive purposes only.

The term attribute as disclosed herein may comprise a characteristic or property of an entity of a datastore, such as a database table or field. Attributes can be used to define or expand a primary key.

The term datastore as disclosed herein may comprise a digital repository that stores and safeguards the information in computer systems. A datastore can be network-connected storage, distributed cloud storage, a physical hard drive, or virtual storage. A datastore may store both structured data and unstructured data.

The term relationship as disclosed herein may comprise a one-to-one, a one-to-many, and a many-to-many relations in a datastore including but not limited to relational databases.

The term embedding model as disclosed herein may comprise a machine learning model where an embedding is a numerical representation of the dataset and/or the datastore, in whole or a subset, where a feature vector of the embedding model includes but is not limited to an attribute of a datastore table, a prompt or rule definition.

Example 2: The limitations of Example 1, further comprising using the machine learning model to determine a subgraph from the data store that is relevant to the rule wherein computing the result is further based on the subgraph.

The above limitations advantageously enable a system to determine a subset of a datastore that is relevant to the rule. These limitations further improve computer functionality since the central processing unit may require less usage to process the subset instead of the entirety of the datastore. Additionally, the limitations realize the benefits described with respect to Example 1.

The term subgraph as disclosed herein may mean a subset, a part or a whole of a datastore including but not limited to a table, a file or unstructured data.

The term relevant as disclosed herein may mean information that organizes data in predefined relationships where data is stored in one or more tables (or "relations") of columns and rows. However, use of this example is not intended to be limiting but is instead used for descriptive purposes only.

Example 3: The limitations of Example 2, where determining the subgraph further comprises using the machine learning model based on contextual data of the dataset and the relationship of the contextual data and the datastore.

The above limitations advantageously enable a system to determine a subgraph using the machine learning model based on contextual data of the dataset and the relationship of the contextual data and the datastore. These limitations improve on the functionality of a system by improving the relevancy of the subgraph based on contextual data. Additionally, the limitations realize the benefits described with respect to Examples 1-2.

Example 4: The limitations of Example 1, where computing a result further comprises merging of computing one or more subgraphs.

The above limitations advantageously enable a server to compute a result for a rule of the dataset by merging the computing one or more subgraphs. These limitations improve computer functionality since the central processing unit may require less usage to process one or more subgraphs instead of the datastore in its entirety. Additionally, the limitations realize the benefits described with respect to Examples 1-3.

Example 5: The limitations of Example 1, where wherein computing a result further comprises using the machine learning model to generate code wherein the code is executed on the datastore.

The above limitations advantageously enable a server to generate code using a machine learning model that executes on the datastore to compute a result of the rule of the dataset. These limitations improve computer functionality since the machine learning model enables the generation of efficient code that reduces the use of central processing unit and memory resources. Additionally, the limitations realize the benefits described with respect to Examples 1-4.

The term code as disclosed herein may comprise a script, a database query or similar processor executable binary instruction; however, use of this example is not intended to be limiting but is instead used for descriptive purposes only.

Example 6: The limitations of Example 1, where the embedding model comprises a feature vector of the attribute of the datastore.

The above limitations advantageously enable a server where the feature vector of a machine learning model comprises an attribute of the datastore. These limitations improve computer functionality since the vectors of the machine learning model are efficiently configured with an attribute of the datastore reducing resource use of central processing unit, graphics processing units and memory. Additionally, the limitations realize the benefits described with respect to Examples 1-5.

Example 7: The limitations of Example 1, where the rule of the dataset comprises a key performance indicator of the dataset.

The above limitations advantageously enable a server to compute a result for a rule of a dataset where the rules comprise a key performance indicator of the dataset. Additionally, the limitations realize the benefits described with respect to Examples 1-6.

Example 8: A computer program product comprising one or more computer readable storage media, and program instructions collectively stored on the one or more computer readable storage media, the program instructions executable by a processor to cause the processor to perform the method according to any of Examples 1-7. The computer program product of Example 8 realizes the benefits described with respect to Examples 1-7. The computer program product of Example 8 can advantageously be implemented into a variety of computer program products.

Example 9: A computer system comprising a processor and one or more computer readable storage media, and program instructions collectively stored on the one or more computer readable storage media, the program instructions executable by the processor to cause the processor to perform the method according to any of Examples 1-7. The computer system of Example 7 realizes the benefits described with respect to Examples 1-7. The computer system of Example 9 can advantageously be implemented into a variety of computer devices.

Example 10: A computer-implemented method that comprises responsive to receiving a dataset, determining by a system a relationship of a datastore by training a machine learning model wherein the machine learning model comprises an embedding model based on an attribute of the datastore. The method further comprises determining by the system, a rule of the dataset using the machine learning model and the relationship of the datastore. The method further comprises computing using the machine learning model, a result for a rule of the dataset based on the datastore wherein the result comprises a description of the rule of the dataset in the datastore. The method further comprises where the embedding model comprises a feature vector of the attribute of the datastore. The method further comprises using the machine learning model to determine a subgraph from the datastore that is relevant to the rule wherein computing the result is further based on the subgraph. The above limitations realize the technical benefits described with respect to Examples 1-7.

Example 11: A computer program product comprising one or more computer readable storage media, and program instructions collectively stored on the one or more computer readable storage media, the program instructions executable by a processor to cause the processor to perform the method according to Example 10. The computer program product of Example 9 realizes the technical benefits described with respect to Examples 1-7. The computer program product of Example 9 can advantageously be implemented into a variety of computer program products.

Example 12: A system comprising one or more processors and one or more computer-readable storage media collectively storing program instructions which, when executed by the one or more processors, are configured to cause the one or more processors to perform the method according to Example 10. The system of Example 12 realizes the benefits of Examples 1-7. The system of Example 12 can advantageously be implemented into a variety of computing devices.

Aspects of the present disclosure can be implemented in a variety of technical use cases. The following use cases are merely exemplary and are not intended to limit the scope of the disclosure.

In a use case, a server receives a product requirements document (PRD). A relationship of a relational database is determined by training a machine learning model such as a large language model where the machine learning model comprises an embedding model based on an attribute of the datastore. Tables of the database belonging to the same cluster may potentially have lineage relationships. Further analysis is required to determine primary and foreign key relationships between tables. Information such as column name, column type, and column sample values can be utilized, followed by employing a LLM model to evaluate the similarity and relationships between columns across tables. The rules of the PRD, such key performance indicators (KPI), are determined by extracting the contextual data of the PRD and outputting the KPI using the LLM. A subgraph of the database is generated using the LLM based on contextual data of the dataset and the relationship of the contextual data and the database. A result for a KPI of the PRD is computed based on code generated by the LLM and is executed on the database where the result comprises a description of the KPI in the database.

The present disclosure provides for a method, a machine-readable medium, and a system for Data and Artificial Intelligence-driven Automatic Data Model Build.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Data center environment 100 contains an example of an environment for the execution of at least some of the computer code involved in performing the inventive methods, such as an Application module 200 that provides Data and Artificial Intelligence-driven Automatic Data Model Build. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made. Available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of Application Programming Interfaces (API). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

FIG. 2 depicts a block diagram that illustrates an example of artificial intelligence driven data modeling in an environment in accordance with an illustrative embodiment. In a particular embodiment, the components of the diagram 220 show aspects of the Application 200 of FIG. 1.

In the illustrated embodiment, a dataset 245 is received by the system, responsive to the dataset, a machine learning model 240 is trained on an attribute of a datastore 230 to determine a relationship 235 of the datastore. Based on the machine learning model and the relationship, a rule of the dataset is determined 250, followed by determining a subgraph 255 of contextual data of the dataset and the relationship of the contextual data and the datastore.

In an embodiment, a machine learning model 265 performs code generation 275. In another embodiment, the system executes generated code on the datastore for result table generation 270, and final report table generation 260. For example, the generated code may comprise a script, a database query or similar processor executable code; however, use of this example is not intended to be limiting but is instead used for descriptive purposes only. It should be noted that although machine learning model 240 and machine learning model 265 are depicted as distinct, this is not limiting and, in some embodiments, there may be one or more neural networks.

In an embodiment, the machine learning model comprises an embedding model. Machine learning models cannot interpret information intelligibly in their raw format and require numerical data as input. Machine learning (ML) model embeddings are used to convert real-word information into numerical representations called vectors. Vectors are numerical values that represent information in a multi-dimensional space. They help ML models to find similarities among sparsely distributed items. Every object an ML model learns from has various characteristics or features. The number of dimensions can reach a thousand or more depending on the input data's complexity. The closer an embedding is to other embeddings in this n-dimensional space, the more similar they are. Distribution similarity is determined by the length of the vector points from one object to the other (measured by Euclidean, cosine or other).

In another embodiment, training a machine learning model comprises configuring a feature vector to represent an attribute of a datastore in a vector format where each element of the vector comprises a feature such as a particular attribute's occurrences in the datastore. For example, the feature vector may comprise a database column type, a schema or other descriptive characteristic of a datastore. In another embodiment, a feature vector comprises properties of the data representing the patterns in the data. For example, the feature vectors may comprise attributes of a plurality of historical data. The system performs matrix operations on a large amount of the data represented in the feature vectors to determine patterns in the data.

In some embodiments, the machine learning models comprise of an unsupervised learning model that is given raw unlabeled historical data. In embodiments, the model infers similarities and differences of the attributes of the historical data based on known methods such as clustering, association and dimensional reduction. It should be noted that in some embodiments, the machine learnings models may comprise of supervised and unsupervised learning models in combination.

In an embodiment, a datastore 230 is a digital repository that stores and safeguards the information in computer systems. A datastore can be network-connected storage, distributed cloud storage, a physical hard drive, or virtual storage. It can store both structured data like information tables and unstructured data like emails, images, and videos. Organizations use datastores to retain, share, and manage information across business units.

In another embodiment, a datastore 230 is a relational database that may be a collection of information that organizes data in predefined relationships where data is stored in one or more tables (or "relations") of columns and rows, making it easy to see and understand how different data structures relate to each other. Relationships are a logical connection between different tables, established on the basis of interaction among these tables. Attributes (columns) specify a data type, and each record (or row) contains the value of that specific data type. All tables in a relational database have an attribute known as the primary key, which is a unique identifier of a row, and each row can be used to create a relationship between different tables using a foreign key-a reference to a primary key of another existing table. But relational databases also excel at showing very complex relationships between data, allowing you to reference data in more tables as long as the data conforms to the predefined relational schema of the database.

Figure 3:
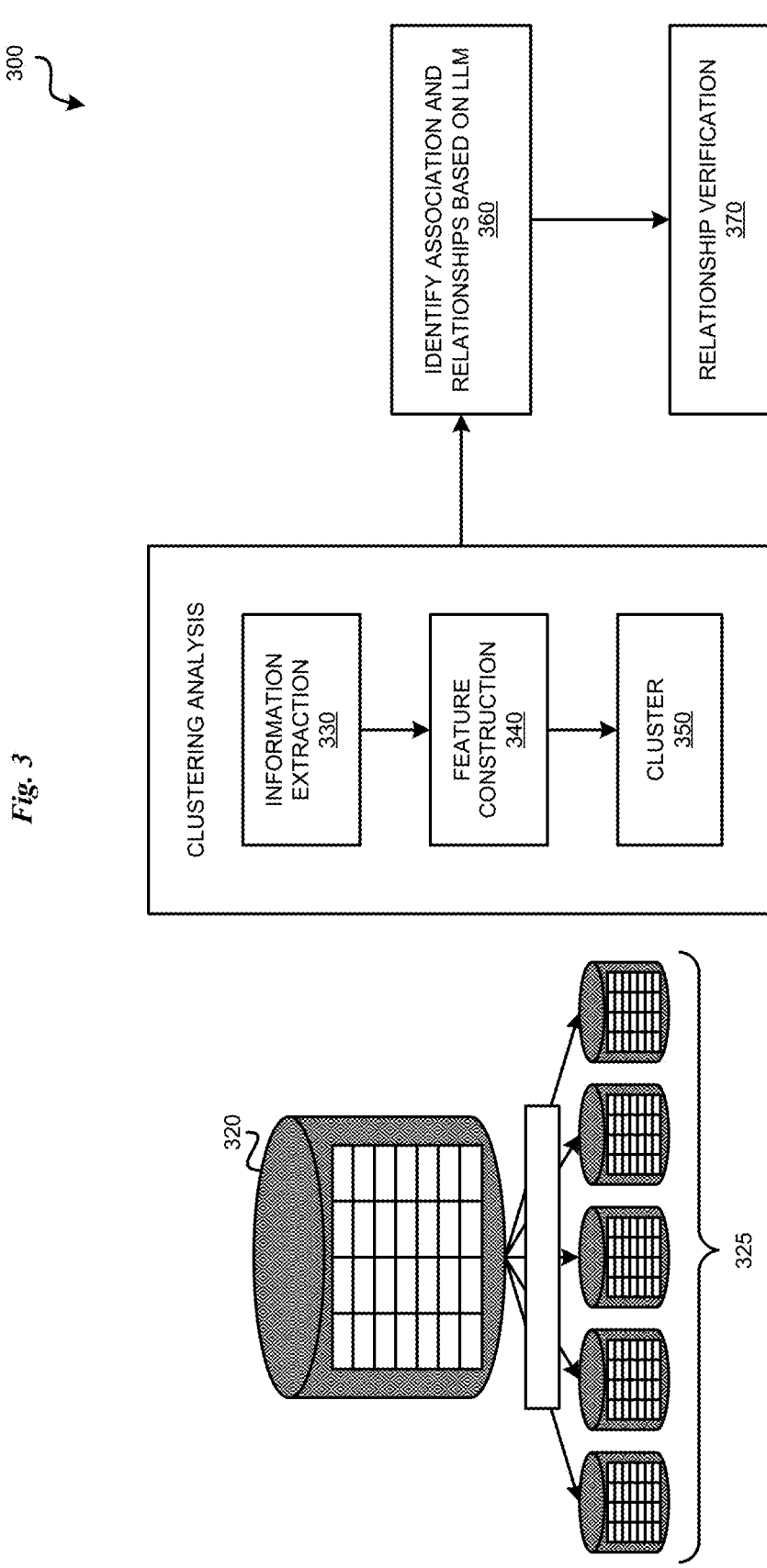
FIG. 3 depicts a block diagram that illustrates an example of building a relationship of a datastore in an environment in accordance with an illustrative embodiment.

FIG. 3 depicts a block diagram that illustrates an example of building a relationship of a datastore in an environment in accordance with an illustrative embodiment. In a particular embodiment, the components of the diagram 300 show aspects of components 230 and 235 of FIG. 2 and the components of Application 200 of FIG. 1.

In the illustrated embodiment, the associations and relationships of the datastore 320 such as a relational database and its associated tables 325 are determined by information extraction 330, feature construction 340, and clustering component 350. For example, in the information extraction component 330 the available information comprising attributes such as table schema and column type are combined to form the unique characteristic information of each table. The feature construction component 340 transforms the characteristic information of tables into feature vectors using the embedding model neural network.

In an embodiment, the feature construction component 340 may create a multi-dimensional vector for a characteristic of the datastore and may initialize the dimensions of each vector with random values. In some embodiments, feature construction component may also create and initialize multi-dimensional vectors for each representation of other characteristics of the datastore.

In another embodiment, a vector space model is generated by optimizing a loss function over the training examples. A training component may iteratively optimize the loss function by adjusting vectors to maximize the output of the loss function for positive training examples and to minimize the output for negative training examples, as the loss function calculates a cosine similarity between a focus vector and another vector representing the training example. In particular, the loss function may be optimized by adjusting vectors using a gradient descent algorithm. A derivative of the loss function may be calculated with respect to each of the vectors that is adjusted; this derivative indicates whether a value of a dimension of a vector should be increased or decreased. A vector is adjusted in the correct direction (e.g., by increasing or decreasing the value of a dimension), and a next vector is selected for adjusting, thereby incrementally improving the loss each time.

In an embodiment, a natural language processing task is performed using the vector space model. A natural language processing component may perform one or more conventional or other natural language processing tasks using the vector space model, including tasks such as disambiguation, topic recognition, sentiment analysis, question answering, machine translation, and the like.

In an embodiment, the clustering component 350 may employ one or more known clustering algorithms such as known algorithms K-means, Support Vector Machine (SVM) etc., individually or collectively, to cluster the feature vectors and obtain clustering results. The system may identify association and relationships 360 such as determining tables belonging to the same cluster may potentially have lineage relationships. Further analysis is required to determine primary and foreign key relationships between tables. Information such as column name, column type, and column sample values can be utilized, followed by employing the machine learning model to evaluate the similarity and relationships between columns across tables. In certain embodiments, the system also performs relationship verification 370 for example, obtaining a list of candidate relationships, such as Table A, A1, and Table B, B1, B2, B3 from the datastore 320, potentially having internal and external key relationships. Further verification may be necessary to ascertain unique internal and external key pairs. In another example, SQL commands are generated by the system for instance using the machine learning model based on assumed internal and external key relationships using several rows of data and execute them. Successful execution of these SQL commands indicates the existence and correctness of the internal and external key relationships.

Figure 4:
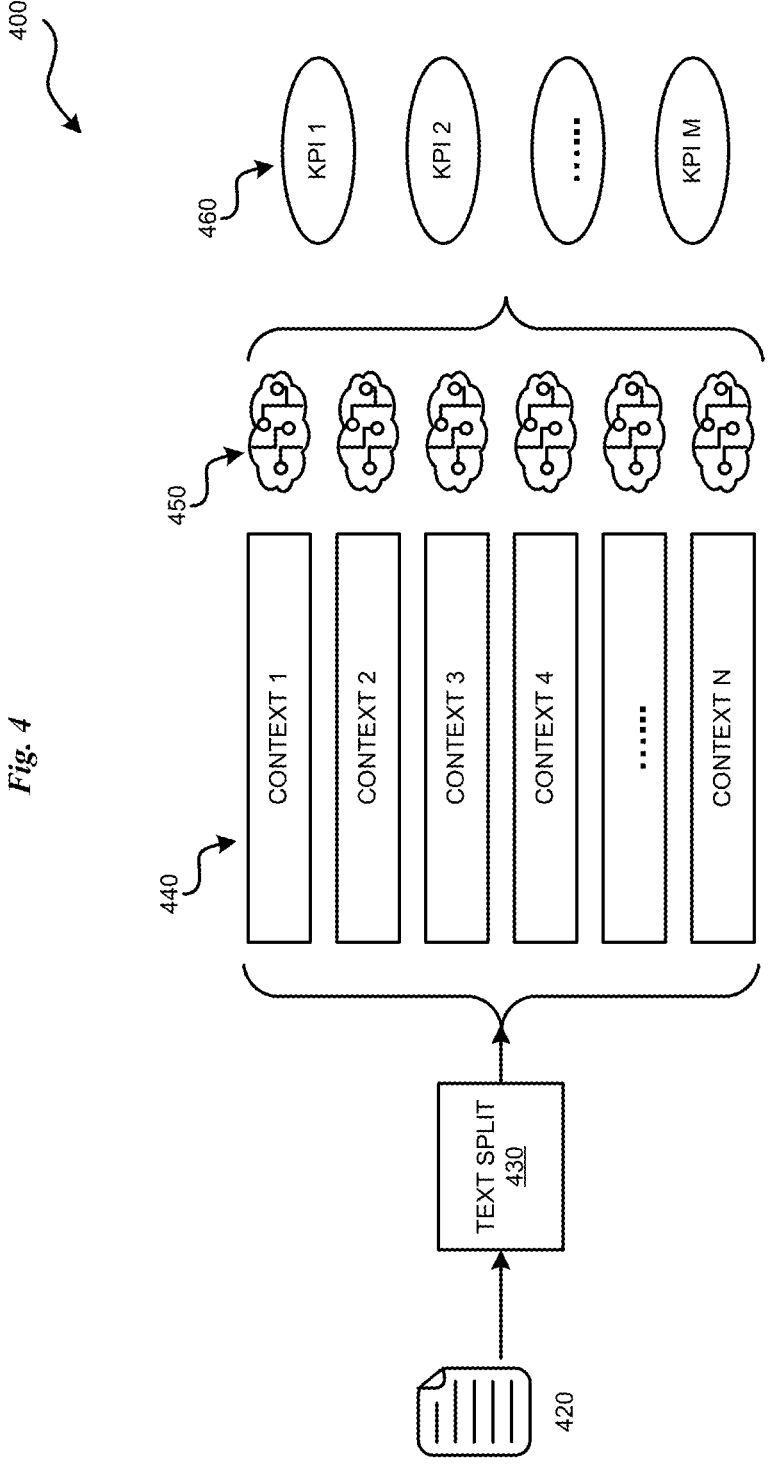
FIG. 4 depicts a block diagram that illustrates an example of determining a rule of the dataset in an environment in accordance with an illustrative embodiment.

FIG. 4 depicts a block diagram that illustrates an example of determining a rule of the dataset in an environment in accordance with an illustrative embodiment. In a particular embodiment, the components of the diagram 400 show aspects of component 250 of FIG. 2 and the components of Application 200 of FIG. 1.

In the illustrated embodiment, a dataset 420 is received by a system and analysis performed on the dataset. In examples, a dataset 420 may be a product requirements document (PRD which may contain a large amount of key performance indicator (KPI) information. However, due to the excessive length of the PRD document, it exceeds the token limit of the current large machine learning models. Additionally, the PRD document contains redundant information.

In an embodiment, a rule may be a KPI. For example, a KPI is a critical quantifiable indicator of progress toward an intended result. KPIs provide a focus for strategic and operational improvement, create an analytical basis for decision making and help focus attention on what matters most. They can also be used to judge progress or achievements against a set of benchmarks or past performance. A PRD defines the requirements of a particular product, including the product's purpose, features, functionality, and behavior. It serves as a guide for business and technical teams to help build, launch, or market the product.

For example, the text split 430 is performed where the document will be spliced into sections according to the table of contents to first extract the document's table of contents. In some examples, a tool written in a programming language such as Python may be used to split the document. Then, based on the entries in the table of contents, the system saves each section of the document as a new context object 440. A split document may be saved into a file, with the filename corresponding to the section title. The system may analyze each context using a machine learning model 450 to extract the definitions and related calculation logic to determine the KPIs 460 from the context.

Figure 5:
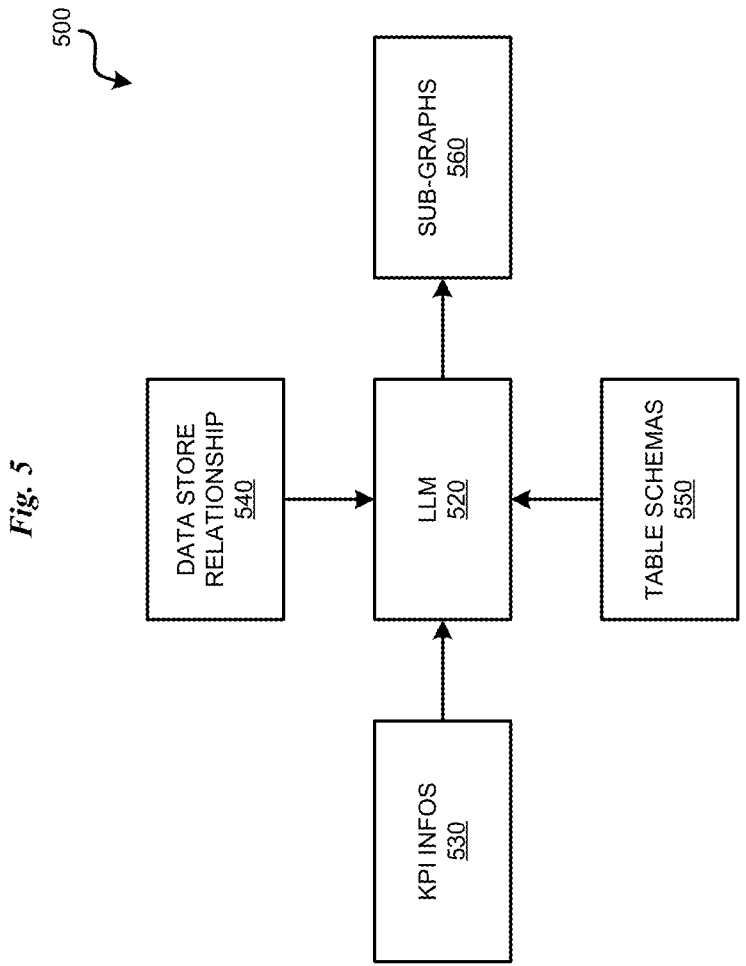
FIG. 5 depicts a block diagram that illustrates an example of determining a subgraph from the datastore in an environment in accordance with an illustrative embodiment.

FIG. 5 depicts a block diagram that illustrates an example of determining a subgraph from the datastore in an environment in accordance with an illustrative embodiment. In a particular embodiment, the components of the diagram 500 show aspects of component 255 of FIG. 2 and the components of Application 200 of FIG. 1.

In the illustrated embodiment, the KPI information 530, the datastore relationship 540, and table schemas 550 are input into the machine learning model for example, a large language model (LLM) 520 to output subgraphs 560. In an example, the datastore relationship 540 are determined from the table connection relationships that were previously described, including primary key-foreign key relationships and other associations. The KPI information 530 are also previously described. Using SQL database tools such as SQL Server Management Studio, MySQL Workbench, etc., table schemas 550 for all tables in the current datastore may be determined. This schema information may include details about table fields, data types, indexes, constraints, and more.

In an embodiment, a machine learning model for example, a LLM configured for natural language processing, assesses which tables are most likely to contain data relevant to the KPIs based on the relationships between the tables and the KPI information. Based on the analysis results, the LLM evaluates and identifies the set of subgraphs or a subset of the datastore most relevant to each KPI. These table sets will serve as the foundation for subsequent data analysis and processing.

Figure 6:
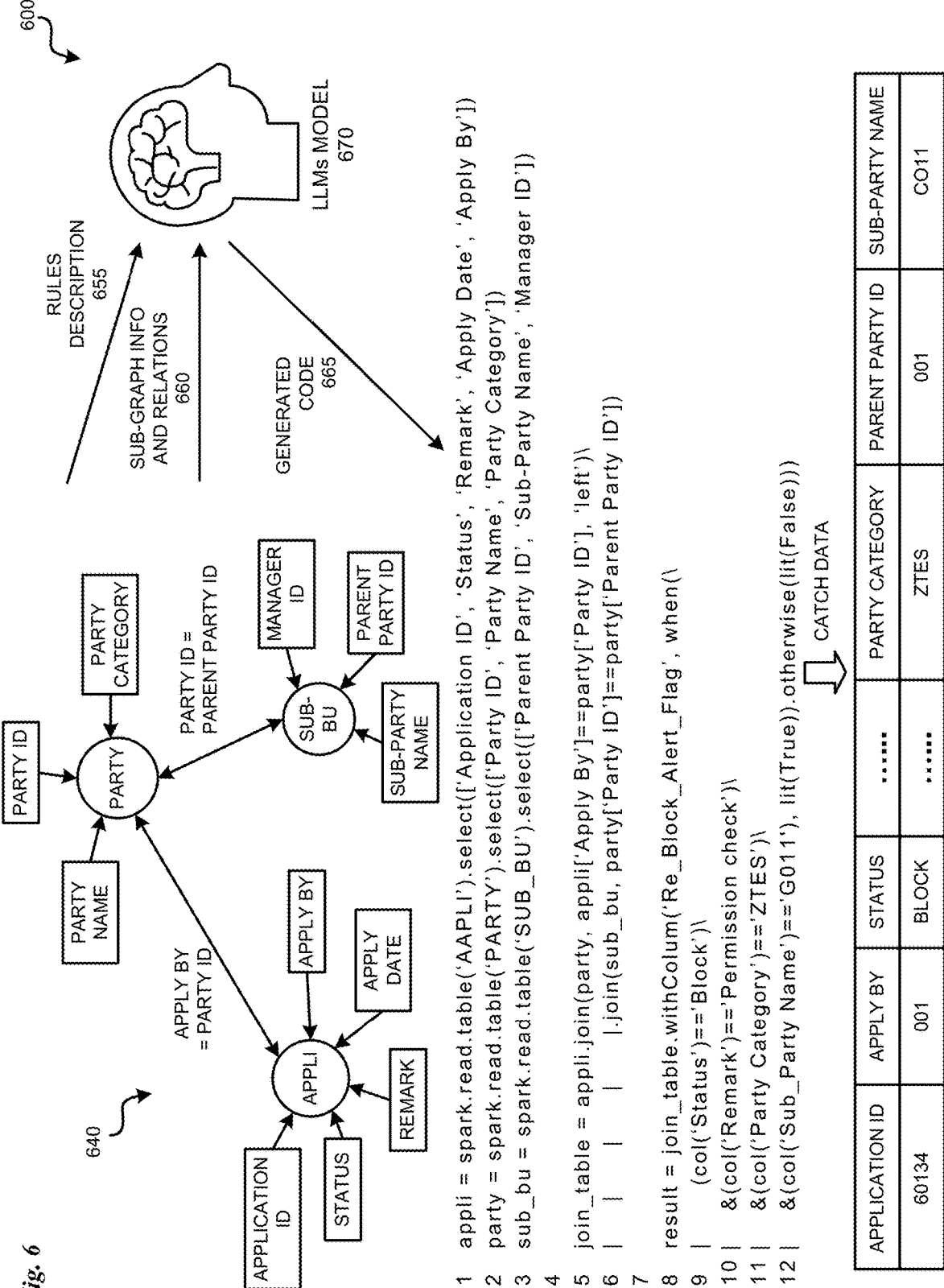
FIG. 6 depicts a block diagram that illustrates an example of computing a result for a rule of the dataset in an environment in accordance with an illustrative embodiment.

FIG. 6 depicts a block diagram that illustrates an example of computing a result for a rule of the dataset in an environment in accordance with an illustrative embodiment. In a particular embodiment, the components of the diagram 600 show aspects of components 270 and 275 of FIG. 2 and the components of Application 200 of FIG. 1.

In the illustrated embodiment, the information and relationships 660 of the subgraph 640 and the rules description 655 are inputted into the machine learning model such as a LLM 670 which then outputs generated code 665. For example, as described above, the PRD document is an input to the LLM to identify the KPIs those need to be calculated, then summarize the definition and calculation logic for each identified KPI. The subgraph associated with each KPI is determined from the datastore. For computing a result for a rule or KPI of the dataset, the rules description 655 and the information and relationships 660 of the subgraph 640 will be summarized in prompt as the input of a machine learning model to generate the code 665. The generated code will be validated and executed by the system based on the datastore to obtain the result for a rule.

FIG. 7A depicts a block diagram that illustrates an example of computing a result for a rule of the dataset in an environment in accordance with an illustrative embodiment. In a particular embodiment, the components of the diagram 700 show aspects of components 270 and 275 of FIG. 2 and the components of Application 200 of FIG. 1.

In the illustrated embodiment, the rule definition 720, the identified related tables and their schema information, the information and relationships of the subgraph and a mockup sample data 740 are shown connected to node A 790 (where node A may be shown for illustrative purposes only). In an example, the mockup sample data 740 may be derived from the related tables of the datastore or from the machine learning model trained on historical data. In another example, the mockup sample data may be preset and/or user defined.

FIG. 7B depicts a block diagram that illustrates an example of computing a result for a rule of the dataset in an environment in accordance with an illustrative embodiment. In a particular embodiment, the components of the diagram 700 show aspects of components 270 and 275 of FIG. 2 and the components of Application 200 of FIG. 1.

In the illustrated embodiment, a prompt 760 is composed of the identified related tables and their schema information, the information and relationships of the subgraph and the mockup sample data 740 for each related table, connected via node A 790 (shown here for illustrative purposes only). The information contained in the prompt is resolved from the identified subgraph. For example, an embedding model trained on the input data may be used to derive the prompt. After code is generated by the machine learning model, the generated code 770 is executed by the system to output a result of the KPI 780.

In an embodiment, the machine learning model comprises a LLM that is trained based on supervised or unsupervised learning. For example, the LLM may use a transformer-based deep learning algorithm trained on mockup data, a prompt or historical data. In another example, the machine learning model is an embedding model where a feature vector includes but is not limited to an attribute of the subgraph, a prompt or rule definition.

Figure 8A:
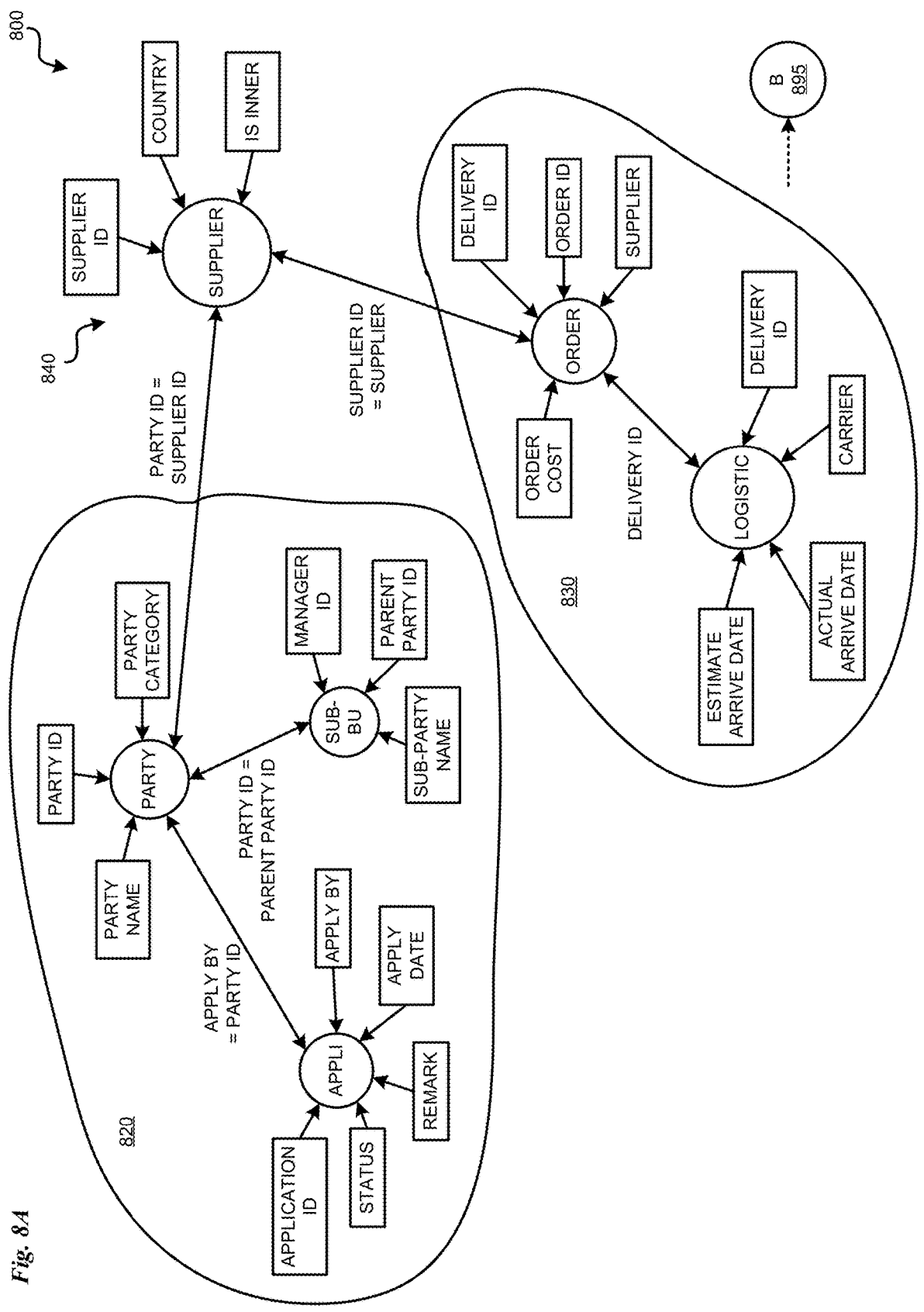
FIG. 8A depicts a block diagram that illustrates an example of merging of computing one or more subgraphs in an environment in accordance with an illustrative embodiment.

FIG. 8A depicts a block diagram that illustrates an example of merging of computing one or more subgraphs in an environment in accordance with an illustrative embodiment. In a particular embodiment, the components of the diagram 800 show aspects of components 270 and 275 of FIG. 2 and the components of Application 200 of FIG. 1.

In the illustrated embodiment, the fields and/or columns of a subgraph of a first KPI 820, and the fields and/or columns of a subgraph of a second KPI 830, are connected by the Supplier table and/or key 840. For example, the Supplier which may be a key or field of a subgraph or table in the datastore is common and/or related to Party field of the subgraph of the first KPI 820 and Order field of the subgraph of the second KPI 830. For illustrative purposes, node B 895 is shown to indicate that FIGS. 8A and 8B are to be referenced together.

Figure 8B:
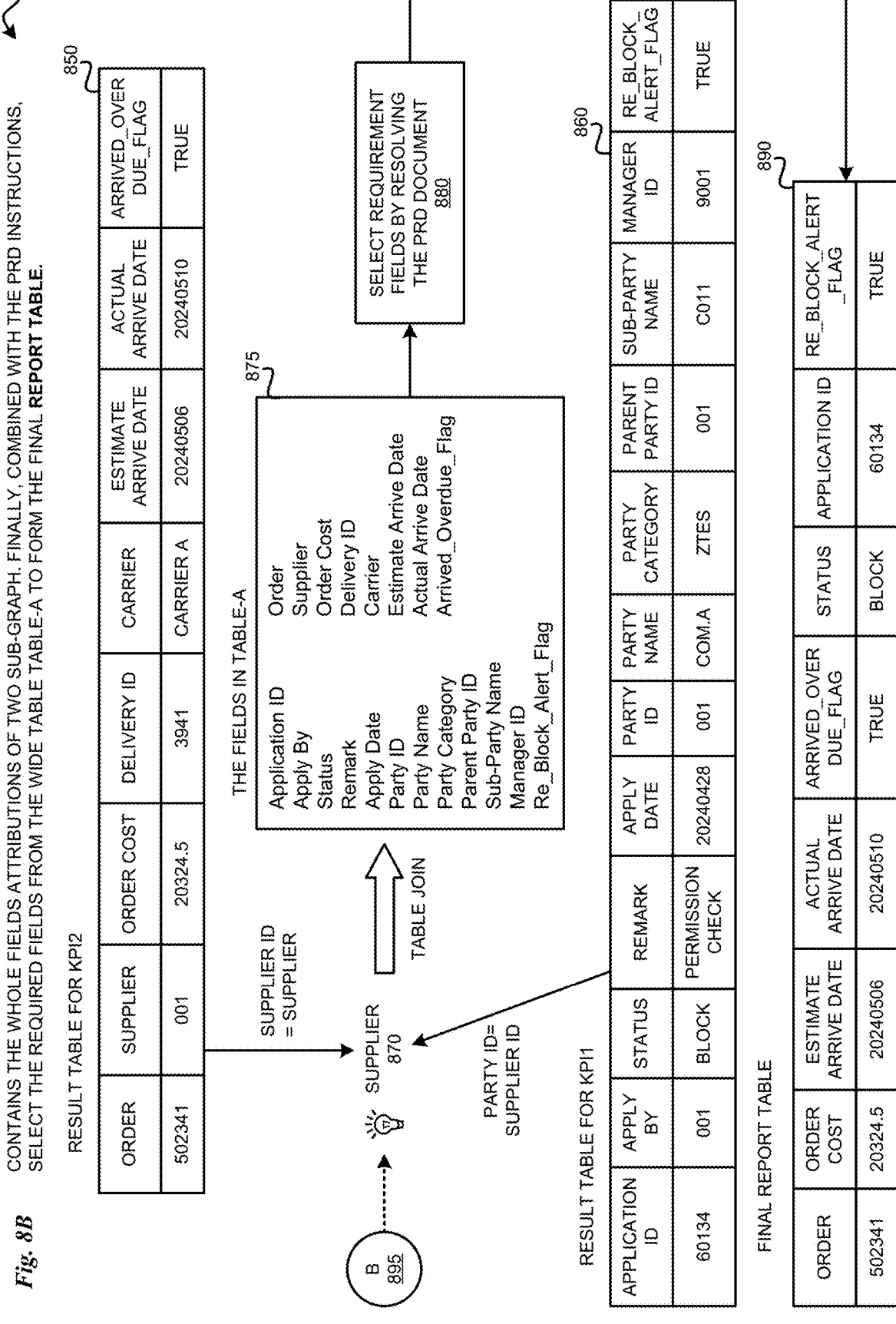
FIG. 8B depicts a block diagram that illustrates an example of merging of computing one or more subgraphs in an environment in accordance with an illustrative embodiment.

FIG. 8B depicts a block diagram that illustrates an example of merging of computing one or more subgraphs in an environment in accordance with an illustrative embodiment. In a particular embodiment, the components of the diagram 800 show aspects of components 270 and 275 of FIG. 2 and the components of Application 200 of FIG. 1.

In the illustrated embodiment, a subgraph of a first KPI 820, represented as a table 860 and subgraph of a second KPI 830, represented as a table 850, are connected by the Supplier field 840. For example, the Supplier may be a key or field of a subgraph or table in the datastore. By using the Supplier key 840, 870, the result tables of the first KPI and the second KPI are merged into a merged table 875, which contains the whole fields attributions of the two subgraphs. For example, the merging may comprise of a SQL join operation. In another embodiment, the required fields 880 are selected from the merged table 875 to form the result table 890. For illustrative purposes, node B 895 is shown to indicate that FIGS. 8A and 8B are to be referenced together.

Figure 9:
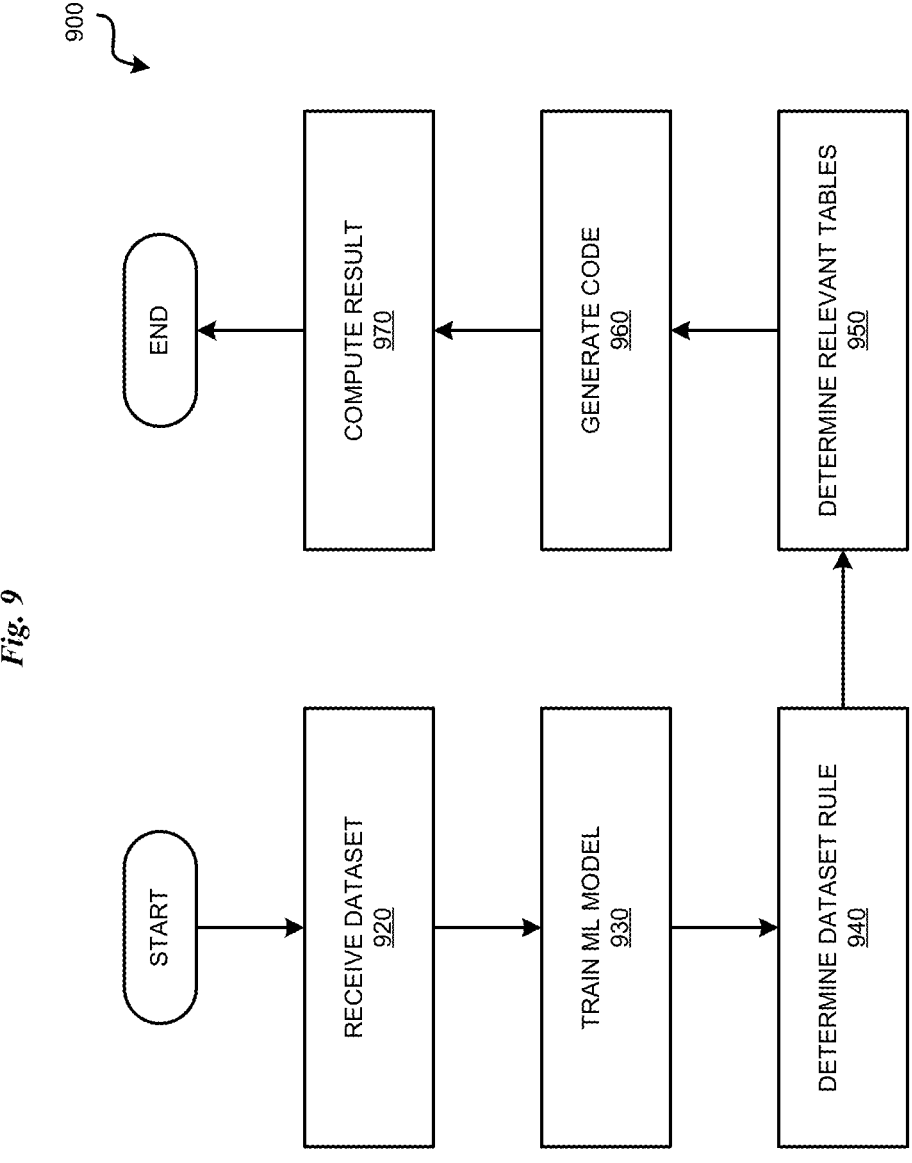
FIG. 9 depicts a flowchart that illustrates an example method of artificial intelligence driven data modeling in an environment in accordance with an illustrative embodiment.

FIG. 9 depicts a flowchart that illustrates an example method of artificial intelligence driven data modeling in an environment in accordance with an illustrative embodiment. In a particular embodiment, the components of the diagram 900 show aspects of the components of FIGS. 1-8.

In the illustrated embodiment, a system receives a dataset 920 and in response determines a relationship of a datastore by training a machine learning model 930 where the machine learning model comprises an embedding model based on an attribute of the datastore. Next, at step 940, the system determines a rule of the dataset based on the machine learning model and the relationship of the datastore. At step 950, using the machine learning model relevant tables for example a subgraph from the datastore that is relevant to the rule is determined. In some embodiments, code is generated 960 using the machine learning model wherein the code is executed on the datastore to compute the result 970 based on the subgraph.

Figure 10:
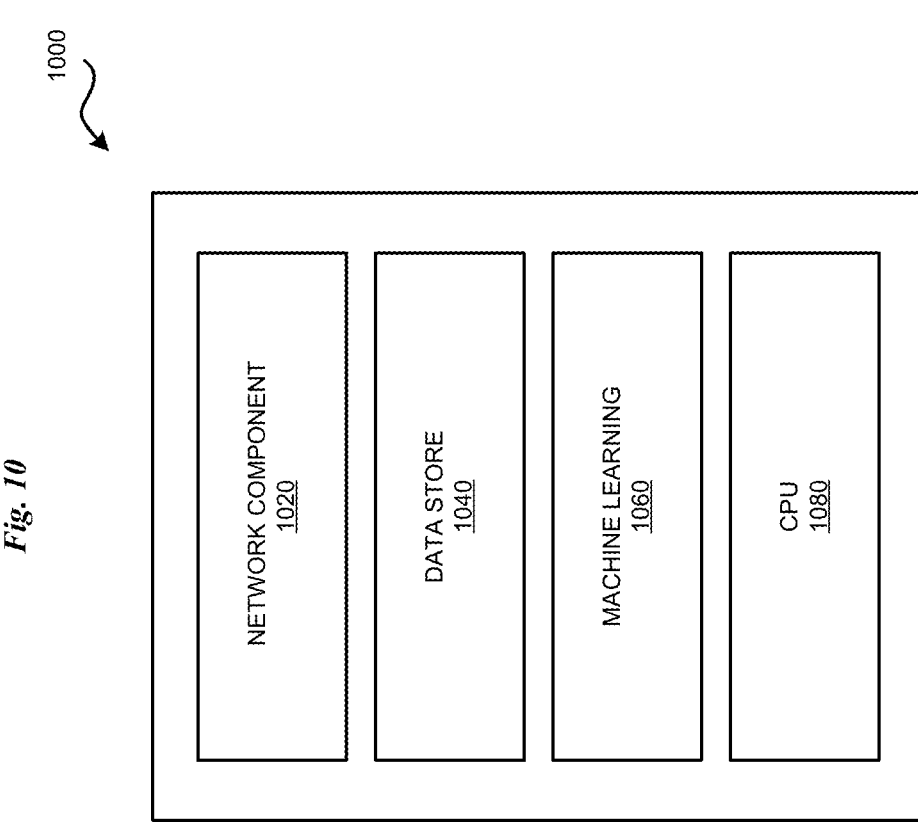
FIG. 10 depicts a system diagram that illustrates an example artificial intelligence driven data modeling system in accordance with an illustrative embodiment.

FIG. 10 depicts a system diagram that illustrates an example artificial intelligence driven data modeling system in accordance with an illustrative embodiment. In a particular embodiment, the components of the diagram 1000 show aspects of the components of FIGS. 1-9.

In the illustrated embodiment, an artificial intelligence driven data modeling system may comprise a network component 1020, a datastore, a machine learning component 1060 and a central processing unit (CPU) 1080. For example, the network component may comprise a network adaptor, a socket, a graphics card, one or more routers, switches, hubs, and/or other network connectivity devices. The network component may transmit and/or receive data via network links such as data may be transmitted and/or received using Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet Protocols (TCP/IP), or other protocols and/or systems suitable for transmitting and receiving data. Data may be transmitted and/or received wirelessly or may utilize cabled network connections or telecom connections such as an Ethernet RJ45/Category 5 Ethernet connection, a fiber connection, a traditional phone wireline connection, a cable connection or other wired network connection.

A physical data storage device is the underlying technology behind a datastore 1040. The datastore may comprise formats such as files, tables, or blocks stored on a device. The device can be local, remote, or in the cloud. Large datastores are typically distributed across multiple physical devices in different geographic locations. Software systems and services abstract the underlying operations of the datastore. Different types of data storage devices provide varying degrees of security and redundancy. A solid-state drive (SSD) is a semiconductor technology that allows the writing and reading of data in flash memory chips. Flash storage technology was commercially available in pen drives before becoming an alternative to hard disk drives (HDD). Compared to an HDD, a physical SSD has no moving parts, which means it has faster performance and a longer lifespan. Hybrid storage array is a physical storage setup that consists of an SSD and an HDD. While an SSD offers a low-latency operation, it costs much more per-unit storage than an HDD. Therefore, organizations use a hybrid storage array to balance performance, capacity, and cost. RAID stands for a redundant array of independent disks. It is a technology that keeps the same data in multiple places on an SSD.

In an embodiment, the system comprises a machine learning component 1060. For example, the machine learning component may comprise a Graphics Processing Units (GPU) that are used for machine learning models due to their highly parallel processing architecture, well-suited for vector operations required in matrix multiplication; Tensor Processing Units (TPUs): designed specifically for machine learning tasks, often with optimized vector processing capabilities for high throughput; and Field Programmable Gate Arrays (FPGA) that may be customized to implement specialized vector processing units for specific machine learning model architectures.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
responsive to receiving a dataset, determining by a machine learning model of a system a relationship of a datastore, comprising a primary key and a foreign-key relationship in a relational database, by training the machine learning model wherein the machine learning model comprises an embedding model based on an attribute of the datastore;
determining by the machine learning model of the system, a rule of the dataset, comprising an indicator metric of achieving a result based on contextual data of the dataset, using the dataset and the relationship of the datastore as input into the machine learning model;
generating code by the machine learning model comprising inputting a prompt into the machine learning model, the prompt comprising the indicator metric and the primary key and the foreign-key relationship in the relational database; and
computing, by executing code generated by the machine learning model responsive to the rule and the relationship of the datastore, outputting the result for the rule of the dataset wherein the result comprises the indicator metric of the rule of the dataset in the datastore.

2. The computer-implemented method of claim 1, further comprising using the machine learning model to generate a subgraph from the datastore that comprises data relevant to the rule wherein computing the result is further based on the subgraph.

3. The computer-implemented method of claim 2, wherein generating the subgraph further comprises using the machine learning model based on contextual data of the dataset and the relationship of the contextual data and the datastore.

4. The computer-implemented method of claim 1, wherein computing the result further comprises merging of subgraphs wherein a first subgraph is computed by the machine learning model from the datastore based on a first indicator metric, a second subgraph of the datastore is computed by the machine learning model from the datastore based on a second indicator metric, and the first subgraph and the second subgraph are merged according to a primary key of the first subgraph and a primary key of the second subgraph.

5. The computer-implemented method of claim 1, wherein the embedding model comprises a feature vector of the attribute of the datastore.

6. The computer-implemented method of claim 1, wherein the rule of the dataset comprises a key performance indicator of the dataset.

7. A computer program product comprising one or more computer readable storage media, and program instructions collectively stored on the one or more computer readable storage media, the program instructions executable by a processor to cause the processor to perform operations comprising:

> responsive to receiving a dataset, determining by a machine learning model of a system a relationship of a datastore, comprising a primary key and a foreign-key relationship in a relational database, by training the machine learning model wherein the machine learning model comprises an embedding model based on an attribute of the datastore;
>
> determining by the machine learning model of the system, a rule of the dataset, comprising an indicator metric of achieving a result based on contextual data of the dataset, using the dataset and the relationship of the datastore as input into the machine learning model;
>
> generating code by the machine learning model comprising inputting a prompt into the machine learning model, the prompt comprising the indicator metric and the primary key and the foreign-key relationship in the relational database; and
>
> computing, by executing code generated by the machine learning model responsive to the rule and the relationship of the datastore, outputting the result for the rule of the dataset wherein the result comprises the indicator metric of the rule of the dataset in the datastore.

8. The computer program product of claim 7, further comprising using the machine learning model to generate a subgraph from the datastore that comprises data relevant to the rule wherein computing the result is further based on the subgraph.

9. The computer program product of claim 8, generating the subgraph further comprises using the machine learning model based on contextual data of the dataset and the relationship of the contextual data and the datastore.

10. The computer program product of claim 7, wherein computing the result further comprises merging of subgraphs wherein a first subgraph is computed by the machine learning model from the datastore based on a first indicator metric, a second subgraph of the datastore is computed by the machine learning model from the datastore based on a second indicator metric, and the first subgraph and the second subgraph are merged according to a primary key of the first subgraph and a primary key of the second subgraph.

11. The computer program product of claim 7, wherein the embedding model comprises a feature vector of the attribute of the datastore.

12. The computer program product of claim 7, wherein the rule of the dataset comprises a key performance indicator of the dataset.

13. A computer system comprising a processor and one or more computer readable storage media, and program instructions collectively stored on the one or more computer readable storage media, the program instructions executable by the processor to cause the processor to perform operations comprising:

> responsive to receiving a dataset, determining by a machine learning model of a system a relationship of a datastore, comprising a primary key and a foreign-key relationship in a relational database, by training the machine learning model wherein the machine learning model comprises an embedding model based on an attribute of the datastore;
>
> determining by the machine learning model of the system, a rule of the dataset, comprising an indicator metric of achieving a result based on contextual data of the dataset, using the dataset and the relationship of the datastore as input into the machine learning model;
>
> generating code by the machine learning model comprising inputting a prompt into the machine learning model, the prompt comprising the indicator metric and the primary key and the foreign-key relationship in the relational database; and
>
> computing, by executing code generated by the machine learning model responsive to the rule and the relationship of the datastore, outputting the result for the rule of the dataset wherein the result comprises the indicator metric of the rule of the dataset in the datastore.

14. The computer system of claim 13, further comprising using the machine learning model to generate a subgraph from the datastore that comprises data relevant to the rule wherein computing the result is further based on the subgraph.

15. The computer system of claim 14, generating the subgraph further comprises using the machine learning model based on contextual data of the dataset and the relationship of the contextual data and the datastore.

16. The computer system of claim 13, wherein computing the result further comprises merging of subgraphs wherein a first subgraph is computed by the machine learning model from the datastore based on a first indicator metric, a second subgraph of the datastore is computed by the machine learning model from the datastore based on a second indicator metric, and the first subgraph and the second subgraph are merged according to a primary key of the first subgraph and a primary key of the second subgraph.

17. The computer system of claim 13, wherein the embedding model comprises a feature vector of the attribute of the datastore.

* * * * *